US008553961B2

(12) United States Patent
Zhu et al.

(10) Patent No.: US 8,553,961 B2
(45) Date of Patent: Oct. 8, 2013

(54) AUTOMATIC PRE-ALIGNMENT FOR REGISTRATION OF MEDICAL IMAGES

(75) Inventors: Yang-Ming Zhu, Solon, OH (US); Steven M. Cochoff, Hudson, OH (US); Cheng-Hsiu Chen, Hudson, OH (US)

(73) Assignee: Koninklijke Philips N.V., Eindhoven (NL)

(*) Notice: Subject to any disclaimer, the term of this patent is extended or adjusted under 35 U.S.C. 154(b) by 313 days.

(21) Appl. No.: 13/054,109

(22) PCT Filed: Jul. 20, 2009

(86) PCT No.: PCT/IB2009/053143
§ 371 (c)(1),
(2), (4) Date: Jan. 14, 2011

(87) PCT Pub. No.: WO2010/015957
PCT Pub. Date: Feb. 11, 2010

(65) Prior Publication Data
US 2011/0116701 A1    May 19, 2011

Related U.S. Application Data

(60) Provisional application No. 61/085,936, filed on Aug. 4, 2008.

(51) Int. Cl.
*G06K 9/00*    (2006.01)
*G06K 9/46*    (2006.01)
(52) U.S. Cl.
USPC .......................................... 382/131; 382/294
(58) Field of Classification Search
USPC ............ 382/303, 131, 294; 378/62; 600/407
See application file for complete search history.

(56) References Cited

U.S. PATENT DOCUMENTS

| 6,154,518 | A | 11/2000 | Gupta |
|---|---|---|---|
| 6,775,405 | B1 * | 8/2004 | Zhu .............................. 382/154 |
| 7,280,710 | B1 | 10/2007 | Castro-Pareja et al. |
| 2002/0150909 | A1 * | 10/2002 | Stuelpnagel et al. ............. 435/6 |
| 2003/0099397 | A1 * | 5/2003 | Matsugu et al. .............. 382/173 |
| 2007/0179377 | A1 * | 8/2007 | Carlsen et al. ................ 600/407 |
| 2008/0055669 | A1 * | 3/2008 | Nagarajan et al. ............ 358/462 |

FOREIGN PATENT DOCUMENTS

| WO | 2006023216 A2 | 3/2006 |
|---|---|---|
| WO | 2006092594 A2 | 9/2006 |

OTHER PUBLICATIONS

Of Meyer et al. ("Semiautomatic Registration of Volumetric Ultrasound Scans", Ultrasound in Med & Biol., vol. 25, No. 3, pp. 339-347, Mar. 1999).*
Gee et al. (Rapid Registration for Wide Field of Views Freehand Three-Dimensional Ultrasound, IEEE, vol. 22, No. 11, Nov. 2003).*

(Continued)

*Primary Examiner* — Amara Abdi

(57) ABSTRACT

In image registration, a similarity measure is computed of first and second images (4, 6) offset at a plurality of relative axial offsets (30). A starting relative axial offset (40) between the first and second images is identified based on the computed similarity measures. An iterative image registration process is performed to relatively register the first and second images (4, 6) using the identified starting relative axial offset between the first and second images as an initial condition for the iterative image registration process. A starting relative in-slice offset (42) may also be identified as an in-slice offset effective to align corresponding slices of the first and second images (4, 6) offset at the starting relative axial offset (40), the identified starting relative in-slice offset also being used as an initial condition for the iterative image registration process.

23 Claims, 4 Drawing Sheets

(56) References Cited

OTHER PUBLICATIONS

Figure 1:
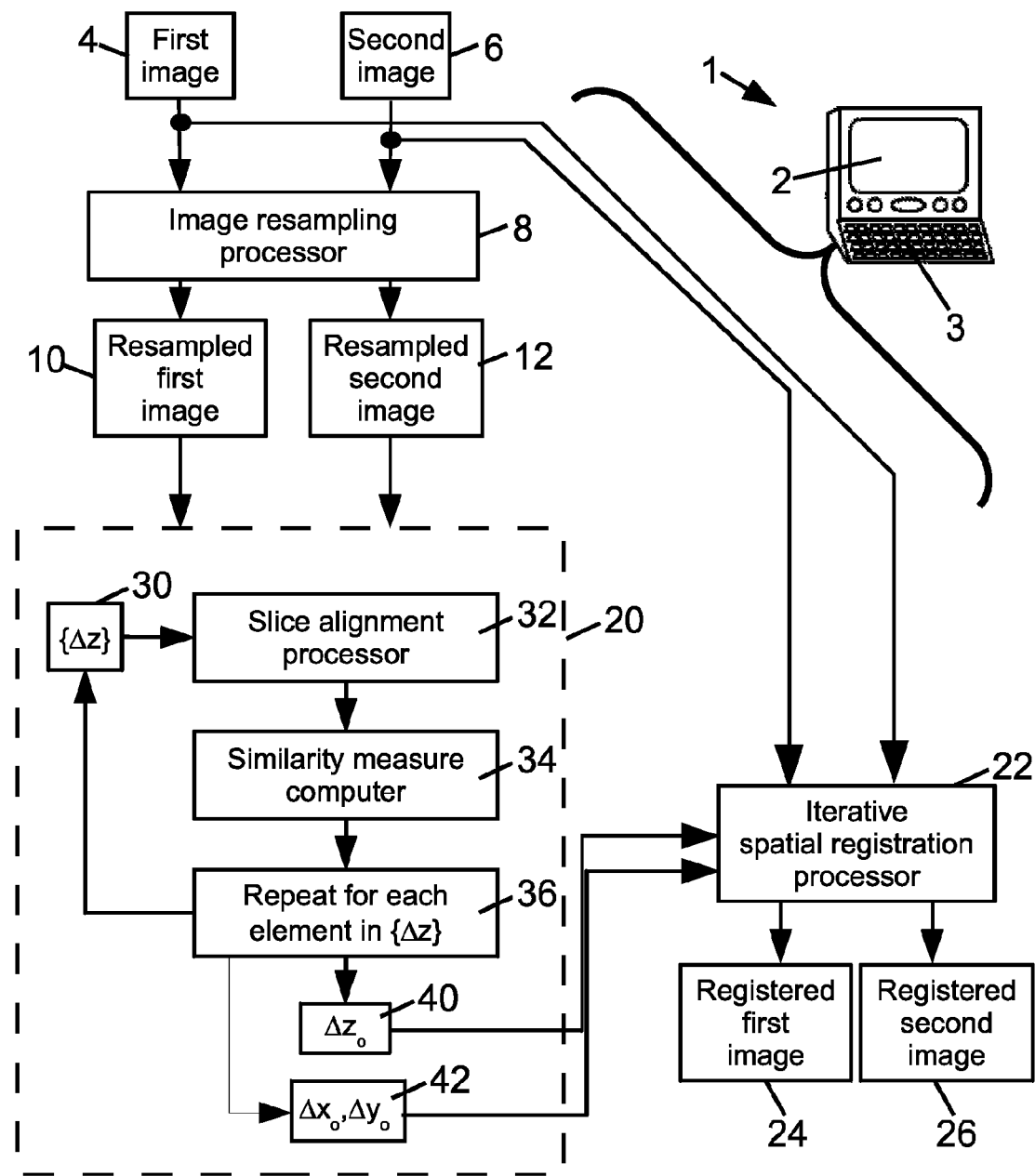

Meyer et al. ("Semiautomatic Registration of Volumetric Ultrasound Scans", Ultrasound in Med & Biol., vol. 25, No. 3, pp. 339-347, Mar. 1999).*

Gee, A. H., et al.; Rapid Registration for Wide Field of View Freehand Three-Dimensional Ultrasound; 2003; IEEE Trans. on Medical Imaging; 22(11)1344-1357.

Krinidis, S., et al.; A Global Energy Function for the Alignment of Serially Acquired Slices; 2003; IEEE Trans. on Information Technology in Biomedicine; 7(2)108-113.

Meyer, C. R., et al.; Semiautomatic Registration of Volumetric Ultrasound Scans; 1999; Ultrasound in Med. & Biol.; 25(3)339-347.

* cited by examiner

AUTOMATIC PRE-ALIGNMENT FOR REGISTRATION OF MEDICAL IMAGES

CROSS REFERENCE TO RELATED APPLICATIONS

This application claims the benefit of U.S. provisional application Ser. No. 61/085,936 filed Aug. 4, 2008, which is incorporated herein by reference.

The following relates to the medical arts, imaging arts, image processing arts, and related arts.

Medical imaging is used for screening, diagnosis, monitoring, therapy planning, clinical and preclinical research, and other medically related applications. Some known medical imaging techniques include computed tomography (CT) imaging, positron emission tomography (PET) imaging, single photon emission computed tomography (SPECT) imaging, magnetic resonance (MR) imaging, and so forth. More recently, various hybrid medical imaging systems have been developed which provide different imaging modalities in a common coordinate system. Two examples of such hybrid systems are the Gemini™ Time-of-Flight PET/CT scanner and the Precedence™ SPECT/CT scanner, both of which are available from Koninklijke Philips Electronics N.V., Eindhoven, the Netherlands. The Gemini™ system, for example, provides PET and CT scanners arranged coaxially aligned with a common subject support. This combination has certain complementary capabilities—for example, CT tends to provide structural information while PET tends to provide complementary functional information.

When images are acquired by different imaging modalities or same modality at different time (either using different standalone scanners implementing the different modalities, or using a single hybrid system), a common task is to spatially register the images. Spatial registration facilitates proper comparison of corresponding features of the images. Spatial registration may also be an intermediate operation in a more complex image processing workflow—for example, images from different modalities may be spatially registered and then combined or "fused" to create a single image containing information derived from both modalities or their combination.

Numerous spatial registration techniques have been developed. In rigid or non-deformational techniques, the images from the different modalities are rigidly shifted, rotated, or so forth to achieve spatial alignment or registration. In nonrigid or deformational techniques, one or both images may also be stretched, compressed, or otherwise deformed to achieve spatial alignment or registration.

Most spatial registration techniques are iterative in nature. That is, the technique makes an iterative adjustment of one or both images to gradually improve or optimize the value of an image comparison function that measures the relative alignment of the images. The success or failure of an iterative spatial registration technique is dependent upon the initial conditions—if the images are approximately aligned to start with, then the iterative spatial registration technique is likely to quickly converge to a well-aligned condition; whereas, if the images are grossly misaligned to start with, then the iterative spatial registration technique may converge slowly or not at all.

Although substantial work has been undertaken in development of iterative spatial registration techniques, surprisingly little effort has gone into techniques for establishing the initial conditions for these techniques. Indeed, one approach is simply to start off with the native coordinates of the two images derived from the respective imaging systems. This approach is likely to be successful only if these native coordinate systems are closely aligned. In many cases, this assumed similarity of native coordinate systems will fail. For example, if the images to be aligned are a head image and a whole-body image, then it is likely that the native coordinates for the former are respective to the head while the native coordinates for the latter are respective to the torso.

Another approach is to align the centers of mass of the imaged subject in the images to be registered. This approach is likely to fail if the spatial extent of the two images is significantly different. For the previous example of alignment of a head image and a whole body image, alignment of the centers of mass will place the head image overlapping the torso of the whole body image.

Yet another approach is manual prealignment of the images. This approach is likely to succeed, so long as the human performing the manual prealignment is knowledgeable about the anatomical region or regions depicted in the imaged subject. However, a relatively advanced user interface is required, for example displaying the two images and providing a mechanism by which the user can shift one image respective to the other, or providing a mechanism by which the user can delineate common regions in the two images (e.g., draw a box around the head in both the head image and the whole body image). For three-dimensional images, the manual alignment process may need to be repeated for two or three different views, e.g. the axial, sagittal, and coronal views, in order to provide prealignment in all three spatial dimensions.

Manual prealignment typically slows down the image processing. In settings in which a large number of images are acquired using different imaging modalities, manual prealignment may be tedious or impractical. For example, a preclinical study may image dozens of laboratory animals at various stages of the condition under study, using various imaging modalities, and it may be desired to spatially register different images of the same animal acquired at different times, or to register different images of the same animal acquired using different imaging modalities, or to register images of different animals to facilitate comparison. In view of these possibilities, the image processing performed over the course of a preclinical study can easily entail dozens or even hundreds of different image registration operations, and performing manual prealignment in each case is undesirable. It would be advantageous to perform the alignments in an automated batch mode, but employment of manual prealignment precludes this option. Similar issues can arise in large clinical studies involving dozens or hundreds of human subjects, or in a diagnostic medical imaging facility at a hospital or clinic that processes many patients each day.

The following provides new and improved apparatuses and methods which overcome the above-referenced problems and others.

In accordance with one disclosed aspect, an image registration method is disclosed, comprising: computing a similarity measure of first and second images offset at a plurality of relative axial offsets; identifying a starting relative axial offset between the first and second images based on the computed similarity measures; and performing an iterative image registration process to relatively register the first and second images using the identified starting relative axial offset between the first and second images as an initial condition for the iterative image registration process. In some embodiments, a starting relative in-slice offset is also identified as an in-slice offset effective to align corresponding slices of the first and second images axially offset at the starting relative axial offset, with the identified starting relative in-slice offset also being used as an initial condition for the iterative image registration process.

In accordance with another disclosed aspect, a processor is disclosed, which is configured to perform an image registration method as set forth in the immediately preceding paragraph. In accordance with another disclosed aspect, a storage medium is disclosed, which stores instructions to perform an image registration method as set forth in the immediately preceding paragraph.

In accordance with another disclosed aspect, an image registration system is disclosed, comprising: a preregistration processor configured to compute a starting relative axial offset between first and second images based on an image similarity measure; and an iterative image registration processor configured to spatially register the first and second images using the identified starting relative axial offset between the first and second images as an initial condition for the spatial registration process. In some embodiments, the preregistration processor includes a slice alignment processor configured to align an imaged subject in corresponding generally axially transverse slices of the first and second images, the image similarity measure being computed based on aligned corresponding generally axially transverse slices, and the iterative image registration processor is further configured to use an in-slice offset determined at least in part by the slice alignment processor as an initial condition for the spatial registration process.

One advantage resides in providing faster image registration.

Another advantage resides in providing more accurate image registration.

Another advantage resides in providing more robust image registration.

Still further advantages will be apparent to those of ordinary skill in the art upon reading and understand the following detailed description.

FIG. 1 diagrammatically shows an image registration system including a preregistration component.

Figure 2:
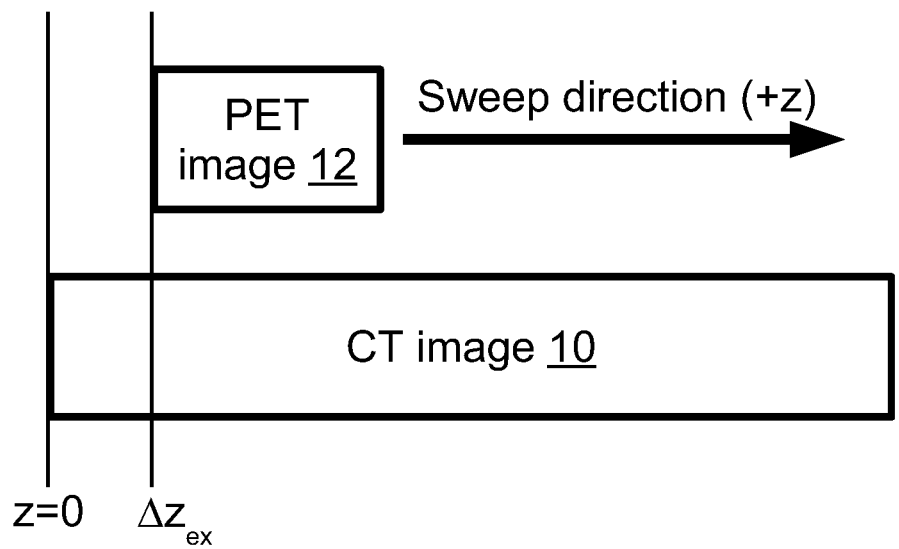

FIG. 2 diagrammatically shows a sweeping algorithm for identifying an axial offset between two images.

Figure 3:
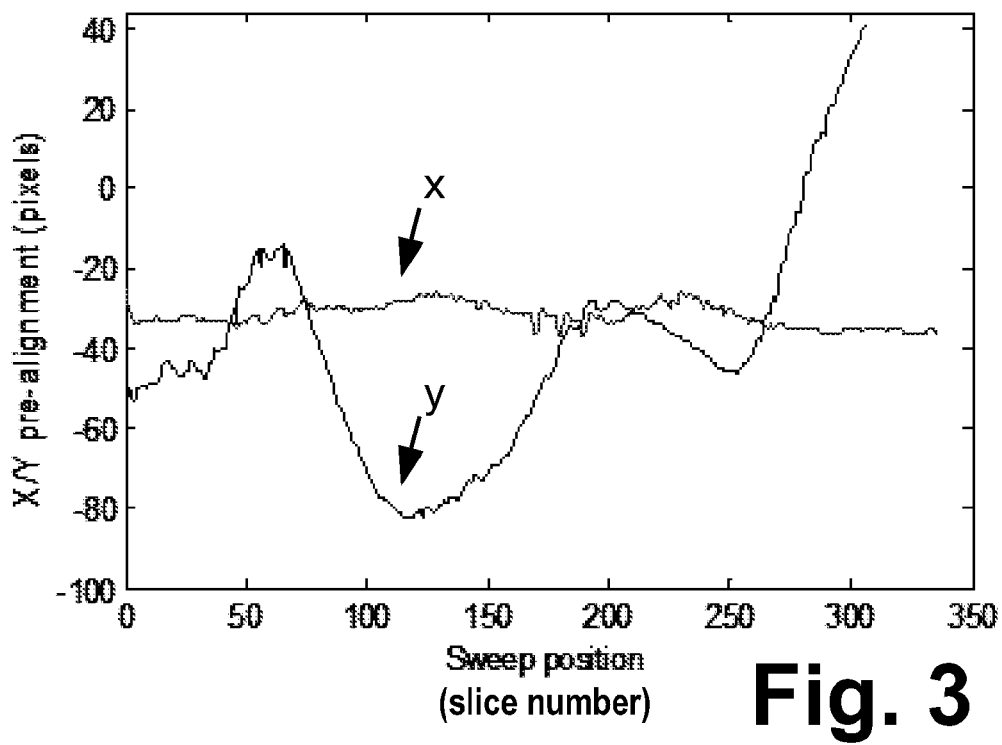

FIG. 3 plots x and y pre-alignment parameters in the course of a volume sweeping such as that diagrammatically depicted in FIG. 2.

Figure 4:
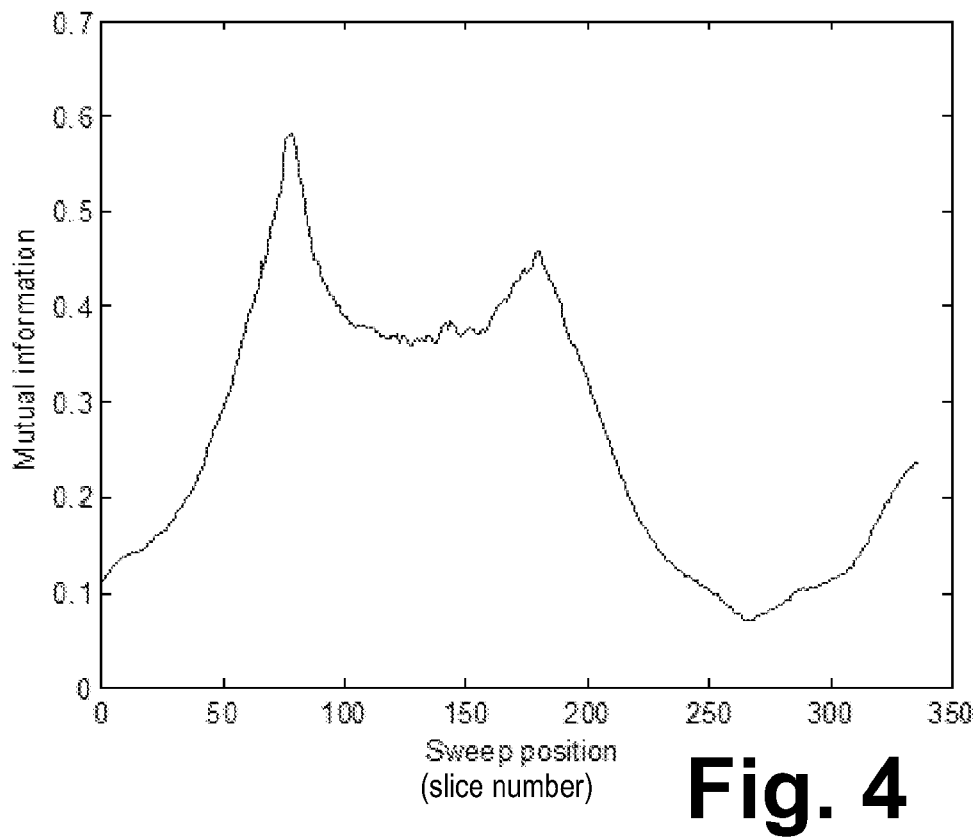

FIG. 4 plots a mutual information (MI) similarity measure obtained for different axial offsets in the course of a volume sweeping such as that diagrammatically depicted in FIG. 2.

Figure 5:
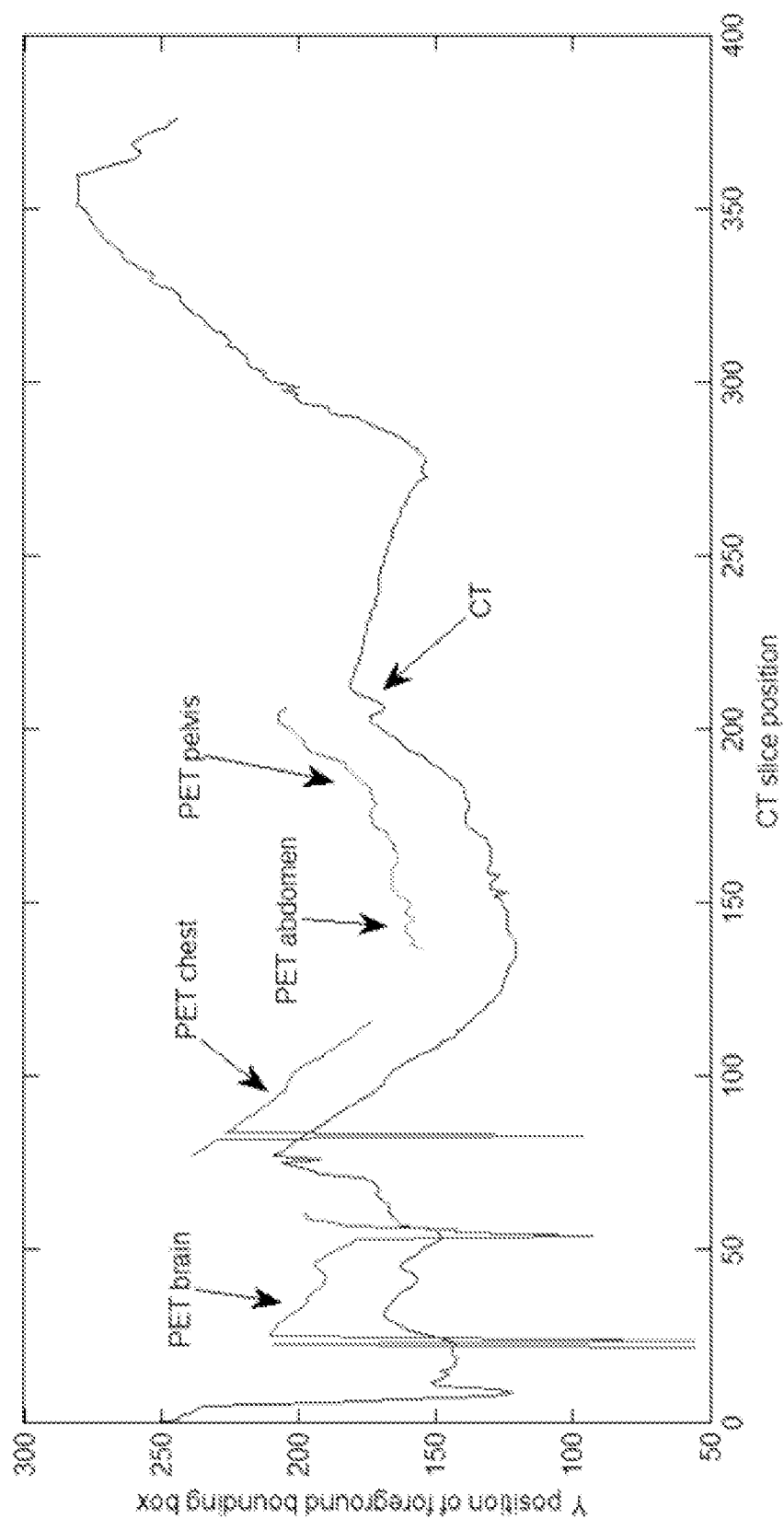

FIG. 5 plots the y position of a foreground bounding box of a CT image and of PET brain, chest, abdomen, and pelvis image volume segments, where the PET volume segments are shown in their true axial positions respective to the CT image and the PET volume segments had a spatial translation of 34 pixels (40 mm) imparted in the "y" direction.

With reference to FIG. 1, an image registration system comprises a suitable digital data processing device, such as an illustrated computer 1, and typically includes or has access to a display 2 for displaying images, and typically includes or has access to one or more user input devices, such as an illustrated keyboard 3 and/or a mouse or other pointing device, for receiving user inputs. For example, the user may use the input device or devices 3 to identify or locate on a digital storage medium (for example, a hard drive) first and second images 10, 12 that are to be spatially registered. Additionally or alternatively, the image registration system may automatically receive the first and second images 10, 12 that are to be spatially registered from an image acquisition or storage device or plurality of image acquisition or storage devices.

Substantially any digital data processing device can be configured to embody the disclosed image registration and preregistration systems or methods. For example, the disclosed image registration and preregistration systems or methods can be embodied on a personal computer, control computer of a medical imaging scanner, a computer or server providing a picture archiving and communication system (PACS); a remote Internet server, or so forth. The disclosed image registration and preregistration systems or methods can also be embodied as a digital data storage medium storing instructions to perform the disclosed image registration and preregistration algorithms, such storage medium being suitably embodied, for example, as a magnetic disk, magnetic tape, optical disk, random access memory (RAM), read-only memory (ROM), FLASH memory, remote Internet server storage, or so forth.

The first and second images 10, 12 are expected to be images of a same subject or of two different but similar subjects, such as two different human subjects, two different animal subjects (e.g., mice, guinea pigs, et cetera) of a preclinical study, an ancient Egyptian mummy and a standard human phantom, or so forth. The first and second images 10, 12 are also expected to have at least some overlap of similar regions, for example one image may be of a human head while the other image may be of an entire human body (that is, a whole body image) that includes the head as well as the torso, legs, et cetera.

The first and second images 10, 12 are volumetric images acquired by a suitable volumetric imaging modality, such as for example: magnetic resonance (MR) imaging; computed tomography (CT) imaging; positron emission tomography (PET) imaging; single photon emission computed tomography (SPECT) imaging; or so forth. The first and second images 10, 12 may both be acquired using the same imaging modality, or may be acquired using different imaging modalities. As one illustrative example, the first and second images 10, 12 may be MR images acquired using the same MR scanner on different days. As another illustrative example, the first and second images 10, 12 may be a CT image and a PET image, respectively, of the same subject. As another illustrative example, the first and second images 10, 12 may be a CT image and a SPECT image, respectively, of the same subject.

The first and second images 10, 12 each comprise a plurality of image slices distributed along an axial direction. As used herein, the axial direction is a direction generally transverse to image slices, although some tilt between the image slices and the axial direction is contemplated. As used herein, the axial direction may, but does not necessarily, correspond to the anatomical axial direction of the subject. The coordinate z is sometimes used herein to denote the axial direction. Illustrative coordinates that are in the slices, that is, "in-plane", are sometimes denoted herein by the coordinates x and/or y. The image slices may correspond to acquisition slices, or may be mathematically generated slices obtained by mathematically interpolating/resampling a volumetric image into a plurality of image slices distributed along and generally transverse to an axial direction. Each image slice comprises a two-dimensional array or distribution of pixels.

The first and second images 10, 12 preferably have corresponding axial directions, slice orientations and thicknesses, and arrays or distributions of pixels. In some embodiments, this may not be the case for as-acquired images 4, 6. For example, if the images 4, 6 are acquired using different imaging modalities, the slice resolution (corresponding to the two-dimensional array or distribution of pixels comprising each slice) and/or the slice thicknesses and/or slice orientations may be different for the different modalities. Similarly, even when using the same imaging modality to acquire both images 4, 6, the scan parameters may optionally be different such that the images 4, 6 have different slice resolution and/or slice thicknesses and/or slice orientation. Still further, it is contemplated for the images 4, 6 to have differently defined axial directions. To accommodate such differences, if present in the as-acquired images 4, 6, an image resampling processor 8 suitably resamples the images to generate the first and second images 10, 12 with corresponding axial directions, slice orientations and thicknesses, and arrays or distributions of pixels.

The first and second images 10, 12 are initially processed by a preregistration processor 20 configured to compute a starting relative axial offset between first and second images that minimizes an image similarity measure. Optionally, the preregistration processor 20 is further configured to compute one or more relative in-plane offsets between first and second images, or between corresponding slices of the first and second images, offset by the starting relative axial offset. An iterative image registration processor 22 is configured to spatially register the first and second images using the identified starting relative axial offset between the first and second images as an initial condition for the spatial registration process. Optionally, the iterative image registration processor 22 is further configured to use the one or more relative in-plane offsets as further initial conditions. The iterative image registration processor 22 can employ substantially any iterative image registration process, including rigid image registration processes, nonrigid or deformational image registration processes, or so forth. Because the first and second images 10, 12 are automatically pre-registered by the preregistration processor 20, the iterative image registration process has an enhanced likelihood of rapid convergence as compared with applying the iterative image registration processor 22 without taking advantage of the initial conditions provided by the preregistration processor 20.

The output of the iterative image registration processor 22 is registered first and second images 24, 26 corresponding to the first and second images 10, 12 but spatially shifted and optionally deformationally adjusted (in the case of a deformational iterative registration process) such that an imaged subject represented in the registered first and second images 24, 26 is substantially spatially aligned. The registered first and second images 24, 26 may be variously embodied. In some embodiments, the registered first and second images 24, 26 are output as actual images, that is, sets of voxels representing the registered first and second images 24, 26. In some embodiments, the registered first and second images 24, 26 are embodied as the first and second images 10, 12 combined with one or more registration parameters such as axial offset values, in-plane offset values, deformation values, or other registration parameters that can be applied to one or both of the first and second images 10, 12 to adjust one or both of first and second images 10, 12 such that the imaged subject is substantially spatially aligned. In some embodiments, the registered first and second images 24, 26 are represented by a single "fused" image that combines the first and second images 10, 12 after spatial registration to generate a single image including combined content of both images. Optionally, the registered first and second images 24, 26 are displayed on the display 2, for example as a maximum intensity projection (MIP), three-dimensional rendering, or other suitable displayed representation.

With continuing reference to FIG. 1, the prealignment processor 20 employs the following components. A relative volume sweeping of the first and second images 10, 12 is carried out by computing a similarity measure of first and second images 10, 12 offset at a plurality of relative axial offsets $\{\Delta z\}$ 30. At each relative axial offset $\Delta z$, a slice alignment processor 32 is configured to align an imaged subject in corresponding generally axial transverse slices of the offset first and second images 10, 12. A similarity measure computer 34 computes a similarity measure of the offset first and second images offset at the relative axial offset $\Delta z$, with the corresponding slices of the offset first and second images 10, 12 aligned as determined by the slice alignment processor 32. This process is repeated 36 for each axial offset of the plurality of axial offsets $\{\Delta z\}$ 30, so as to determine an optimal starting relative axial offset $\Delta z_o$ 40. The starting relative axial offset $\Delta z_o$ 40 is used as an initial condition for the iterative spatial registration process performed by the iterative spatial registration processor 22. That is, the iterative spatial registration processor 22 starts the first iteration with the first and second images 10, 12 relatively offset by the starting relative axial offset $\Delta z_o$ 40, so that the iterative spatial registration process is initiated at an axial offset that is expected to be relatively close to the final offset value determined by the iterative spatial registration process.

Optionally, one or more optimal starting in-slice offsets 42 determined by the slice alignment processor 32 for the optimal starting relative axial offset $\Delta z_o$ 40 are also conveyed from the preregistration processor 20 to the iterative registration processor 22 for use as a further initial condition for the iterative spatial registration process. For example, the one or more optimal starting in-slice offsets 42 may include an offset in one in-plane direction $\Delta x_o$, or in another in-plane direction $\Delta y_o$, or in two or more non-parallel in-plane directions ($\Delta x_o$, $\Delta y_o$).

In addition to employing the starting offsets 40, 42 as initial conditions for the iterative registration, it is also contemplated to employ one or more of these values in defining constraints on the iterative registration. For example, the iterative registration process can be constrained to a selected vicinity of the starting offsets 40, 42, such as being constrained to keep the axial shift to within ±10 mm of the starting relative axial offset $\Delta z_o$ 40 during the iterative registration process. Such constraints can further enhance the likelihood of the iterative registration process achieving a satisfactory registration.

Optionally, the preregistration can be presented to the user, for example by displaying the images relatively axially offset by the starting relative axial offset $\Delta z_o$ 40, so that the user can review and approve or reject the preregistration prior to execution of the iterative spatial registration processor 22. Alternatively, the iterative registration processor 22 can be initiated once the preregistration processor 20 outputs the starting offsets 40, 42. Such an automated mode of operation can be useful, for example, to perform batch registration of a large number of images, for example as in a clinical or preclinical study.

In some suitable embodiments of the slice alignment processor 32, a boundary of an imaged subject in corresponding slices of the offset first and second images 10, 12 is suitably determined, in order to align the slices respective to the imaged subject. The imaged subject is, for example, the imaged human or animal subject in the case of medical, clinical, or preclinical imaging. The imaged subject can also be thought of as the "foreground" of the image, with the "background" being the air or other ambient. If the subject is disposed on a support that shows up in the image, then the support may be part of the foreground and should be accounted for in determining a boundary of the imaged subject. Because the preregistration is not a precise registration, the boundary can be approximately delineated, for example as a bounding box that encloses or contains the subject, or as an edge of the subject (preferably in a direction away from the subject support in the case of images that may show the subject support), or a center of the subject.

An illustrative algorithm suitably employed by the slice alignment processor 32 to determine a boundary or center of the imaged subject in corresponding slices of the axially offset first and second images is as follows. First, compute the statistics of each of the first and second slices, including for example average pixel value. Determine a threshold as a scaling constant α times the average pixel value, where α is a positive constant and the average value is the average of all pixels of the slice. The constant α is in some embodiments in a range of about unity to three. The threshold can also be determined in other ways. A boundary criterion parameter k is determined. When k consecutive pixels are above the threshold in a row (e.g., along the x coordinate) or column (e.g., along the y coordinate) of the slice, it is considered part of the image foreground. In some embodiments, this analysis is performed only along the rows, or only along the columns.

The boundaries can then be defined in various ways. In one approach, a top edge of a rectangular bounding box is determined by scanning the image from top to bottom, row by row, until the foreground image condition is met. The row number when scanning stops is denoted as $y_{top}$. The bottom edge of the rectangular bounding box is similarly determined by scanning the image from bottom to top, row by row, until the foreground image condition is met. The row number when scanning stops is denoted as $y_{bottom}$. The left edge of the rectangular bound is determined by scanning the image from left to right, column by column, until the foreground image condition is met. The column number when scanning stops is denoted as $x_{left}$. The right edge of the rectangular bound is determined by scanning the image from right to left, column by column, until the foreground image condition is met. The column number when scanning stops is denoted as $x_{right}$. After four sides are determined, the rectangle starting at ($x_{left}$, $y_{top}$) with a width $x_{right}-x_{left}+1$ and a height $x_{bottom}-x_{top}+1$ is used as the bounding box for the image foreground. When determining the left and right edges of the rectangle, only the portion of the column not scanned during the top and bottom edge determination steps needs to be scanned. This observation is optionally used to reduce the scan extent. Also, if the subject fills the entire volume in one direction (e.g., along the x-coordinate or along the y-coordinate), then the foreground detection algorithm will result in two opposing edges degenerating to the same position. In such a case, the whole image boundary is suitably used to define the foreground.

If the imaged subject is the only feature expected to be visible in the image, then this bounding box should bound the imaged subject. On the other hand, if other features are expected to be visible in the image, such as the subject support, then the imaged subject may have an extent less than that of the complete foreground (which in such instances also includes the subject support). In such a case, the boundary for in-plane alignment may suitably use only those edges of the bounding box known to be distal from the subject support. For example, if it is known that the subject support is below the subject, then optionally the upper edge of the bounding box is used for in-plane alignment.

In some embodiments, once a boundary is suitably defined, for example in the form of a bounding box or one or more lines thereof, the slice alignment processor 32 aligns the corresponding slices of the offset first and second images 10, 12 as follows. In this approach, it is to be understood that if patient table is visible in the image, then the imaged patient table is considered as image foreground, and will have to be excluded in the in-plane image pre-alignment. The in-plane alignment processing can be performed on a per-slice basis, or can be performed for a volume segment comprising a plurality of contiguous slices, or can be performed for the whole image. In this example a volume segment is assumed. Starting with the first image 10, one or more slices are selected at predetermined locations in the volume segment, and the foreground image rectangular bounding boxes are identified. An average of the bounding boxes of the one or more slices is taken as the in-plane bounding box for this volume segment of the first image 10. The corresponding volume segment of the axially offset second image 12 is processed similarly in order to find the foreground image bounding boxes at one or more slices and taking the average of those bounding boxes as the in-plane bounding box for this volume segment of the axially offset second image 12. For given corresponding volume segments of the first and second images 10, 12, the number of slices that are processed and averaged to generate the bounding boxes can range anywhere between one slice and all the slices in the volume segment. Processing speed is enhanced by using fewer slices, with maximum speed obtained by processing one slice, whereas accuracy is enhanced by using more slices.

The in-plane bounding boxes of the two corresponding volume segments of the axially offset first and second images 10, 12 are aligned, and the in-slice offset effective to align the corresponding slices of the axially offset first and second images is output by the slice alignment processor 32. If the patient table is not visible in both images, then this alignment is straightforward, and can be performed, for example, by aligning the centers of two volume in-plane rectangular bounding boxes. Whether patient table is visible can be determined based upon a priori knowledge of the image modality, a priori knowledge of the field of view or determination of the field of view by automated analysis of the image slices, or so forth.

If the patient table is visible in one image but invisible in the other image, a suitable approach is to align the rectangle edge on the side opposing the patient table and align the centers in the other direction. For example, for a supine CT and PET, align the top of the rectangle which gives the offset in y direction and align the center horizontally which gives the offset in x direction.

If the patient table is visible in both images, and the table is on the same side of the patient in both images 10, 12, then a suitable approach is to align the centers of the two volume in-plane bounds. If the patient table is visible in both images, and the table is on opposing sides of the patient, then an estimated or empirical table size can be deducted from one side, the rectangle edge on the side opposing the patient table is aligned, and the centers in the other direction are aligned.

These are merely illustrative embodiments, and other approaches can be used by the slice alignment processor 32 to align a selected slice or slices of a volume segment or of the whole images. For example, rather than finding bounding boxes in a plurality of slices of an image segment and averaging the bounding boxes, another approach is to generate a cumulative slice by summing the plurality of slices, for example, by taking the equivalent of a maximum intensity projection (MIP) along the axial direction for the plurality of slices, and finding the bounding box for the summation slice. In determining the bounding boxes, the choice of threshold can be various, for example a threshold may be computed based on the pixels of each slice individually, or based on the pixels of the plurality of slices, or so forth.

An illustrative algorithm suitably employed by the similarity measure computer 34, which entails volume sweeping, is as follows. The purpose of volume sweeping is to pre-align the image in the axial direction, that is, to determine the optimal starting relative axial offset $\Delta z_o$ 40. In this illustrative example, the volumetric images 10, 12 are taken to be CT and PET images, and the patient coverage of the CT image 10 is significantly larger than the patient coverage of the PET image 12. Although registration of CT and PET images is described as an illustrative example, the disclosed volume sweeping axial alignment is applicable to registering images acquired by any modality and encompassing various portions of the subject.

With reference to FIG. 2, since the objective is to determine a relative axial offset, one can use either of the images 10, 12 as the stationary reference image and sweep the other image. In the example illustrated in FIG. 2, the larger CT image 10 is considered to be the stationary reference image, and the smaller PET image 12 is swept through the CT image 10. However, the opposite arrangement can be used (that is, the PET image can be stationary and the CT image swept).

FIG. 2 illustrates a point in the sweep at which the PET image 12 is axially offset from the CT image 10 by an axial offset $\Delta z_{ex}$, where the illustrated axial offset $\Delta z_{ex}$ is a member of the set or plurality of offsets $\{\Delta z\}$ 30. The sweep is accomplished by evaluating the similarity measure for each offset of the set $\{\Delta z\}$ 30 in order of increasing offset value, thus mathematically simulating "sweeping movement" of the PET image 12 toward the right (using the orientation of FIG. 2). Although processing of the set $\{\Delta z\}$ 30 in order of increasing offset value is typically computationally convenient, the offsets can be processed in other orders. Moreover, the reference (z=0) position is arbitrary, and can be taken as another point other than that illustrated in FIG. 2 including points where only a partial overlap of the volumes occurs.

The similarity measure computed at each axial offset can be mutual information, normalized mutual information, or another similarity measure that is indicative of similarity of the first and second offset images 10, 12. Intuitively, it is apparent that the offset that best spatially aligns the two images 10, 12 should result in the greatest similarity of the axially offset images 10, 12. Before computing the comparison measure at each axial offset, corresponding slices are preferably first aligned in-plane by the slice alignment processor 32. When the sweeping is completed (that is, when a similarity measure has been computed for each axial offset of the set of axial offsets $\{\Delta z\}$ 30), the optimal starting relative axial offset $\Delta z_o$ 40 is identified as the axial offset of the set of axial offsets $\{\Delta z\}$ 30 whose computed similarity measure has the "best" value, for example the largest value in cases in which a larger value of the similarity measure is indicative of greater similarity, or the smallest value in cases in which a smaller value of the similarity measure is indicative of greater similarity. Note that at each sweeping position, the in-plane offsets are also recorded. In particular, the in-plane offsets at the relative axial offset $\Delta z_o$ are used. The optimal starting relative axial offset $\Delta z_o$ 40 and in-plane offsets therefore provides the best initial alignment, and is accordingly used as an initial condition for starting the iterative registration process performed by the iterative registration processor 22. Rather than defining the optimal starting relative axial offset $\Delta z_o$ 40 as the singular axial offset having the "best" similarity measure value, a top few axial offset positions having the highest similarity measure values (or having the lowest values, depending on the similarity measure polarity) can be averaged to determine the optimal starting relative axial offset $\Delta z_o$ 40, so as to reduce the adverse impact of noise.

One suitable sweeping algorithm is as follows. For each sweeping position (that is, each axial offset of the set of axial offsets $\{\Delta z\}$ 30), align two volume segments in-plane using the slice alignment processor 32. As already noted, this can entail aligning corresponding single slices, or aligning one or more corresponding slices of a volume segment and repeating for each volume segment along the axial direction, or so forth. Greater accuracy can be obtained (at the expense of more computations) by performing in-plane alignment at all sweeping positions using the slice alignment processor 32. Greater speed can be obtained (at the expense of less accurate in-plane alignment) by using only one or a few corresponding slices for the in-plane alignment. In one fast approach, it is contemplated to perform the in-plane alignment only once for a single axial offset, instead of for each sweeping position (that is, instead of for each axial offset).

Optionally, the images may be resampled to ensure they have the same slice spacing. However, it is computationally more efficient to perform such resampling initially (as shown in FIG. 1, using the resampling processor 8), and to select the axial offsets of the set of axial offsets $\{\Delta z\}$ 30 to advance a whole number of slices during each step of the sweeping. Similarly, the images optionally can be down-sampled in-plane to form coarse images for sweeping. Again, this may be performed initially using the resampling processor 8 for speed.

FIG. 1 shows the resampled images 10, 12 being processed by the preregistration processor 20 to generate the prealignment starting axial value $\Delta z_o$ 40 and the optional starting in-plane values 42. Since the preregistration is approximate, the preregistration can optionally be performed on down-sampled "low resolution" images 10, 12. In such an embodiment, the resampled images 10, 12 are low resolution down-sampled versions of the original images 4, 6. In performing the down-sampling, each down-sampled pixel represents a group of pixels of the original image, and the average pixel value or a representative pixel value of the group can be used as the value for the corresponding down-sampled pixel value. Typically, however, the iterative registration is preferably performed on the original (high resolution) images 4, 6. The iterative registration processor 22 in such an embodiment receives the original (high resolution) images 4, 6 for registration along with the starting relative axial offset $\Delta z_o$ 40 and in-plane x and y offsets from the preregistration processor. In some embodiments those offsets are given in units of mm or cm, although other units can be used. The values may be suitably adjusted to account for the resolution difference between the down-sampled images 10, 12 used in the preregistration and the original images 4, 6 that are to be registered with high precision using the iterative registration processor 22. Although in the illustrated embodiment the iterative registration processor 22 operates on the original images 4, 6, it is also contemplated to apply the iterative registration processor 22 to the downsampled or otherwise preprocessed images 10, 12 or to omit the preprocessor 8 entirely (in effect making the images 4, 10 the same and the images 6, 12 the same).

The similarity scores can be computed using mutual information, normalized mutual information, or another suitable measure. The similarity measure is computed only over the overlapping axial portion of the two offset images 10, 12. In some embodiments, further computational efficiency is gained by computing the similarity measure for only a subset of the corresponding slices. For example, the similarity measure can be computed only for every third overlapping slice.

Once the similarity scores at all sweeping positions are computed, the starting relative axial offset $\Delta z_o$ 40 is identified. To reduce noise, in some embodiments a few axial offsets having the best similarity measures are identified and the starting relative axial offset $\Delta z_o$ 40 is taken as the average or other statistical measure of these offsets. Optionally, the starting relative in-slice offset 42 is also identified as an in-slice offset effective to align corresponding slices of the first and second images 10, 12 offset by the starting relative axial offset $\Delta z_o$ 40. The starting relative in-slice offset 42 is obtainable as a "by-product" of the axial alignment process in embodiments in which the slice alignment processor 32 is applied for each axial offset of the set of axial offsets $\{\Delta z\}$ 30.

Once the starting values 40, 42 are identified by the pre-registration processor 20, the iterative registration processor 22 can be invoked automatically, or optionally after the user confirms the pre-alignment.

The purpose of the preregistration is to rapidly and automatically obtain initial values for the iterative spatial registration process. Toward that end, certain computation speed optimizations are contemplated as options. The volume can be divided into overlapping segments, and each segment swept as a separate computational thread. When sweeping the volume, it is not necessary to advance at every slice. Some slices can be skipped as the purpose is to provide a coarse alignment. This is equivalent to making the set of axial offsets $\{\Delta z\}$ 30 substantially smaller than the total number of slices in the image 10 or in the image 12. Both volumes can be down sampled to coarse (low resolution) images with matching slice spacing. It is more efficient to advance a whole number of slices during the course of sweeping so that the similarity score calculation does not entail interpolation. When the slice alignment processor 32 computes the volume in-plane boundaries, again only a few slices can be used. It is also contemplated to compute the boundaries only once for a single axial offset, and to use the in-slice adjustment for all axial offsets. When computing the similarity score, a subset of the voxels in the overlapping region may be used.

In an illustrative actually performed example, CT and PET images of a singular subject were acquired using a Gemini™ Time-of-Flight PET/CT scanner. This is not a typical clinical use. However, it facilitates assessment of the performance of the volume sweeping as the ground truth is known. The CT scan of the human subject was a total body scan from head to toe including 377 slices with slice spacing of 5 mm. The PET scan was chopped into four segments: brain (40 slices), chest (40 slices), abdomen (30 slices), and pelvis (40 slices), with the PET slice spacing matching the slice spacing of the CT scan. In this first test, no misalignment is introduced in the transverse plane, and the in-plane alignment was omitted. The overlapping volume segments in each sweeping position were pre-aligned in-plane. Three slice images at ¼, ½, and ¾ positions along the axial direction were used to determine the in-plane volume boundaries. For detecting the boundaries, $\alpha=1$ was used, such that the average pixel value was used as the threshold, and k=5 was used (that is, if five consecutive pixels were above the threshold for the first time, it was deemed that the image foreground had been reached). The CT and PET images were not down-sampled and volume sweeping was advanced slice-by-slice without skipping slices. All slices in the overlapping volume were used. Mutual information was used as the similarity measure, computed using a histogram method with the histogram having size 128×128, and the pixel values were linearly mapped into the histogram bins. The single axial offset having the highest similarity measure was identified as the starting relative axial offset $\Delta z_o$ 40. Table 1 lists the true (known) axial positions and positions given by volume sweeping, both measured by slice position. Good preregistration is observed.

TABLE 1

| Segment (1$^{st}$ subject) | True position (slice position) | Position from sweeping (slice position) |
|---|---|---|
| Brain (40 slices) | 22 | 23 |
| Chest (40 slices) | 77 | 78 |
| Abdomen (30 slices) | 137 | 137 |
| Pelvis (44 slices) | 164 | 164 |

In another test, using the same patient data, an in-plane misalignment was introduced in the PET image, namely a misalignment of 40 mm in the x-direction and 40 mm in the y-direction, and the slice alignment processor 32 was used to accommodate the in-plane misalignments. As the in-plane pixel dimension is 1.17×1.17 mm$^2$, the misalignment corresponds to 34 pixels. The "z" position is reported in units of "slice numbers" where the slice spacing is 5 mm. The results are shown in Table 2, where again the automated preregistration is observed to be effective.

TABLE 2

| Segment (1$^{st}$ subject) | True position (x, y, z) | Position from sweeping (x, y, z) |
|---|---|---|
| Brain (40 slices) | −34, −34, 22 | −26, −32, 22 |
| Chest (40 slices) | −34, −34, 77 | −31, −37, 79 |
| Abdomen (30 slices) | −34, −34, 137 | −30, −35, 137 |
| Pelvis (44 slices) | −34, −34, 164 | −34, −35, 164 |

FIG. 3 plots the x and y pre-alignment parameters in the course of volume sweeping. The sweeping volume is the PET chest. As can be seen, the x parameters are relatively stable. The y parameter changes rapidly, which can be interpreted by the patient body profile from the sagittal image FIG. 4 shows the profile of the mutual information (MI) as a function of the sweeping distance (i.e., the axial offset $\Delta z$). The sweeping volume is the PET chest consisting of 40 slices. As seen in FIG. 4, the mutual information is maximum at slice position 79, which is close to the actual slice position 77 of the PET chest image.

A second subject was also imaged using a whole-body PET/CT study. This subject was imaged with 176 CT slices. The PET scan was chopped into chest (50 slices), abdomen (54 slices), and pelvis (40 slices) volume segments. An in-plane misalignment was introduced (x=−40 mm, y=−40 mm) in PET image, and the slice alignment processor 32 used to accommodate this in-plane misalignment. Mutual information (MI) was again used as the similarity measure. The results are set forth in Table 3.

TABLE 3

| Segment (2$^{nd}$ subject) | True position (x, y, z) | Position from sweeping (x, y, z) |
|---|---|---|
| Chest (50 slices) | 34, 34, 34 | 27, 32, 40 |
| Abdomen (54 slices) | 34, 34, 79 | 34, 30, 77 |
| Pelvis (40 slices) | 34, 34, 129 | 27, 33, 114 |

A third patient was also imaged using a whole-body PET/CT study. The CT scan included 183 slices. The PET scan was chopped into chest (44 slices), abdomen (46 slices), and pelvis (40 slices) segments. An in-plane misalignment was introduced (x=−40 mm, y=40 mm) in PET image. The results are set forth in Table 4.

TABLE 4

| Segment (3rd subject) | True position (x, y, z) | Position from sweeping (MI) (x, y, z) |
|---|---|---|
| Chest (44 slices) | 34, −34, 38 | 40, −35, 35 |
| Abdomen (46 slices) | 34, −34, 81 | 41, −35, 80 |
| Pelvis (40 slices) | 34, −34, 128 | 35, −39, 135 |

With returning reference to FIG. 1, the similarity measure computer 34 can employ various algorithms for measuring similarity of the relatively axially offset first and second images 10, 12. Another illustrative approach is a bodyline matching algorithm, which is based on the observation that the y parameter follows the patient bodyline profile in that direction. This is seen, for example, in FIG. 3. This observation can be used to pre-align the images in the y and z directions. (The x pre-alignment parameter can be determined by aligning the center in the x direction, as already described with respect to the slice alignment processor 32).

FIG. 5 plots the y position of the foreground bounding box of a CT image and of PET brain, chest, abdomen, and pelvis image volume segments, where the PET volume segments that had an imparted offset of 34 pixels (corresponding to 40 mm) in the "y" direction are shown respective to the CT image. As can be seen in FIG. 5, the bodyline profile of the PET as defined by the y-position of the foreground (that is, imaged subject) bounding box has a good correlation with that of the CT. The bodyline matching algorithm therefore comprises: (i) determining the bodyline profile of the first and second images 10, 12 as defined by the y-position of the imaged subject (suitably determined using methods already described with reference to the slice alignment processor 32); and performing a one-dimensional curve matching to identify the axial offset between the bodyline profiles of the first and second images. A suitable algorithm is as follows. First, use the foreground or imaged subject boundary detection algorithm of the slice alignment processor 32 to detect the bounding rectangle on each slice in both images 10, 12. Depending on whether patient table is visible, build a one dimensional profile of the bodyline for each volume. For example, if the patient table in visible in the supine case, the $y_{top}$ is used. The bodyline profiles are optionally smoothed using a moving average, medium filter, or other smoothing filter to suppress outliers or other noise. One profile is swept through the other profile and the similarity measure is computed for each axial offset. Some suitable similarity measures include, for example, correlation, absolute difference, mean square error, or so forth. The axial offset yielding the best similarity measure is selected as the starting relative axial offset $\Delta z_o$ 40. In some embodiments, the profile sweeping is accomplished by computing a correlation function or the like of the two bodyline profiles over a contiguous range of relative axial offsets—in such embodiments, the set of axial offsets $\{\Delta z\}$ 30 comprises the contiguous range of relative axial offsets over which the correlation function is computed, which may be continuous or quasi-continuous (e.g., discretized for computational convenience). The starting in-plane y-offset ($\Delta y_o$) can then optionally be estimated as the vertical (y) shift required to align the bodyline profiles aligned in the axial direction to the starting relative axial offset $\Delta z_o$ 40. The starting in-plane x-offset ($\Delta x_o$) can optionally be estimated using the slice alignment processor 32 applied for the starting relative axial offset $\Delta z_o$ 40.

Some suitable similarity measures for the bodyline matching approach are as follows. A zero mean cross-correlation (ZMCC) measure defined as $$ZNCC(i) = \frac{cov_i(f, g)}{\sqrt{cov_i(f, f) \times cov_i(g, g)}}$$

can be used, where $$cov_i(f, g) = \frac{1}{2K} \times \sum_{m=i-K}^{i+K} (f_{m+i} - \overline{f_i})(g_m - \overline{g_i}),$$

f and g are the two bodyline profiles of the two images 10, 12, the parameter 2K+1 is the size of the overlapping window where the ZMCC is computed, the parameter i is the center of this window, $f_m$ and $g_m$ are profile values at position m, and the barred values are the average inside the window. Another suitable similarity measure is the absolute difference given by $$\text{abs}diff_i(f, g) = \frac{1}{2K+1} \times \sum_{m=i-K}^{i+K} |(f_{m+i} - \overline{f_i})(g_m - \overline{g_i})|$$

where the symbols have the same meaning as in the ZMCC similarity measure. Other suitable similarity measures are also possible.

Moreover, the bodyline profiles can be computed based on other quantitative measures besides a boundary of an imaged subject. For example, the bodyline profile can plot the area of the imaged subject in each transverse slice, as a function of axial position. Another contemplated bodyline profile plots the ellipticity or "roundness" of the imaged subject as a function of axial position. As yet another example, the bodyline profile can plot the integrated or summed or averaged intensity of pixels in each slice as a function of axial position.

The three actually performed examples summarized in Tables 2, 3, and 4 were repeated to align the axial positions using the bodyline matching algorithm. The results are shown in Tables 5, 6, and 7 (where " - - - " means the results are not physically realistic and are not shown).

TABLE 5

| Segment (1st subject) | True position | Found Position (zncc) | Found Position (absdiff) |
|---|---|---|---|
| Brain (40 slices) | 22 | 22 | 22 |
| Chest (40 slices) | 77 | 78 | 79 |
| Abdomen (30 slices) | 137 | — | 139 |
| Pelvis (44 slices) | 164 | 164 | 164 |

TABLE 6

| Segment (2nd subject) | True position | Found Position (zncc) | Found Position (absdiff) |
|---|---|---|---|
| Chest (50 slices) | 34 | 31 | 34 |
| Abdomen (54 slices) | 79 | 80 | 79 |
| Pelvis (40 slices) | 129 | — | 123 |

TABLE 7

| Segment (3rd subject) | True position | Found Position (zncc) | Found Position (absdiff) |
|---|---|---|---|
| Chest (44 slices) | 38 | 25 | 26 |
| Abdomen (46 slices) | 81 | 46 | 112 |
| Pelvis (40 slices) | 129 | 34 | 102 |

The absolute difference similarity measure was found to perform better than the ZMCC similarity measure in these tests. Both similarity measures failed on the third subject, as seen in Table 7. The CT image of the third subject showed a tube attached to the third subject in the abdomen and pelvis areas, which was not visible in the PET image. It is believed that this rather substantial difference between the images is the cause of the failure of the bodyline matching algorithm for the third subject.

The preregistration methods and apparatuses disclosed herein can be variously embodied, for example: as a component of an image registration package used in conjunction with various image viewing and analysis applications; as a software package provided in conjunction with an imaging scanner or picture archiving and communication system (PACS); or as standalone software; or so forth.

Although described respective to iterative registration, the preregistration methods and apparatuses disclosed herein can be used for other purposes. For example, in a slow imaging sequence, the first and second images 4, 6 can be reconstructed from temporally spaced-apart imaging data. The preregistration processor 20 can be applied to these temporally spaced-apart images, and if the approximate offsets 40, 42 are larger than a threshold value this indicates the subject has moved during imaging. In such a case, suitable remedial measures can be taken, such as restarting the imaging data acquisition, repositioning the subject, performing a longer scan to compensate, or so forth. More generally, the preregistration processor 20 can be applied to any pair of nominally aligned images to detect misregistration. When used as a misregistration detector, the approximate offsets 40, 42 are suitably compared against a threshold to detect unacceptably large registration differences. In adaptive radiation therapy, the preregistration processor 20 can be used to estimate positional changes over time of a tumor or other malignancy undergoing radiation therapy, or of a critical structure whose radiation exposure is to be limited, so as to adapt the radiation therapy plan to such changes.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An image registration method comprising:
   computing a similarity measure of first and second images offset at a plurality of relative axial offsets, the computing including aligning corresponding slices of the axially offset first and second images, the slices being oriented generally transverse to the axial direction, wherein the aligning of corresponding slices of the axially offset first and second images comprises aligning a body profile of an imaged subject in corresponding slices, the similarity measure being computed based on the aligned corresponding slices;
   identifying a starting relative axial offset between the first and second images based on the computed similarity measures; and
   performing an iterative nonrigid or deformational image registration process to relatively register the first and second images using the identified starting relative axial offset between the first and second images as an initial condition for the iterative nonrigid or deformational image registration process;
   wherein the computing, identifying, and performing are performed by a computer.

2. The image registration method as set forth in claim 1, further comprising:
   determining the body profile from bounding boxes bounding the imaged subject in slices of the offset first and second images.

3. The image registration method as set forth in claim 1, further comprising:
   determining the body profile of the imaged subject in corresponding slices of the offset first and second images.

4. The image registration method as set forth in claim 3, wherein the determining of the body profile of the imaged subject comprises:
   thresholding slice pixel intensities to generate binarized slice pixel intensities; and
   determining the body profile of the imaged subject as a transition between binarized slice pixel intensities of a first value and binarized slice pixel intensities of a second value.

5. The image registration method as set forth in claim 4, wherein said transition is defined by a contiguous group of N pixels of the first value adjacent at least one pixel of the second value, where N is a positive integer greater than one.

6. The image registration method as set forth in claim 4, further comprising:
   computing a threshold for the thresholding slices of the first image based on a first statistically representative pixel value that is an average or other statistical representation of the values of pixels of slices comprising the first image; and
   computing a threshold for the thresholding slices of the second image based on a second statistically representative pixel value that is an average or other statistical representation of the values of pixels of slices comprising the second image.

7. The image registration method as set forth in claim 3, wherein the determining of the body profile of the imaged subject comprises:
   determining the body profile of the imaged subject along a selected direction in the slice.

8. The image registration method as set forth in claim 1, further comprising:
   identifying a starting relative in-slice offset as an in-slice offset effective to align corresponding slices of the first and second images axially offset at the starting relative axial offset, the identified starting relative in-slice offset also being used as an initial condition for the iterative nonrigid or deformational image registration process.

9. An image registration method comprising:
   computing a similarity measure of first and second images offset at a plurality of relative axial offsets, wherein the similarity measure quantifies similarity of a bodyline profile of an imaged subject in the offset first and second images;
   identifying a starting relative axial offset between the first and second images based on the computed similarity measures; and
   performing an iterative nonrigid or deformational image registration process to relatively register the first and second images using the identified starting relative axial offset between the first and second images as an initial condition for the iterative nonrigid or deformational image registration process;
   wherein the computing, identifying, and performing are performed by a computer.

10. The image registration method as set forth in claim 9, wherein the similarity measure quantifying similarity of a bodyline profile is selected from a group consisting of a correlation or cross-correlation, an absolute difference measure, and a mean square error measure.

11. The image registration method as set forth in claim 9, further comprising:
determining at least in a selected direction an imaged subject boundary in corresponding slices of the offset first and second images; and
determining bodyline profiles of the imaged subject in the offset first and second images based on the determined imaged subject boundary in the selected direction.

12. The image registration method as set forth in claim 9, wherein the computing of the similarity measure of first and second images offset at the plurality of relative axial offsets comprises:
computing the bodyline profile of the imaged subject in each of the first and second images;
wherein the computing of the similarity measure of first and second images offset at the plurality of relative axial offsets comprises relatively sweeping the computed bodyline profiles of the imaged subject in the first and second images over an axial offset range defining the plurality of relative axial offsets and evaluating the similarity measure over the swept axial offset range.

13. The image registration method as set forth in claim 9, wherein the computing of a similarity measure comprises:
computing mutual information or normalized mutual information of the first and second images offset at each of the plurality of relative axial offsets.

14. An image registration system comprising:
a preregistration processor comprising a digital data processing device configured to compute a starting relative axial offset between first and second images based on an image similarity measure that compares a bodyline profile of an imaged subject in the first and second images; and
an iterative image registration processor comprising a digital data processing device configured to spatially register the first and second images using the identified starting relative axial offset between the first and second images as an initial condition for the spatial registration process.

15. The image registration system as set forth in claim 14, wherein the preregistration processor comprises:
a slice alignment processor configured to align the imaged subject in corresponding generally axially transverse slices of the first and second images, wherein the aligning of corresponding generally axially traverse slices of the first and second images comprises aligning the body profile of the imaged subject in corresponding generally axially traverse slices.

16. The image registration system as set forth in claim 15, wherein the iterative image registration processor is further configured to use an in-slice offset determined at least in part by the slice alignment processor as an initial condition for the spatial registration process.

17. The image registration system as set forth in claim 14, wherein the preregistration processor is configured to perform relative volume sweeping of the first and second images to identify the starting relative axial offset between first and second images based on the image similarity measure computed at different axial positions of the relative volume sweeping.

18. A method comprising:
relatively sweeping a first volumetric image comprising a computed tomography (CT) image and a second volumetric image comprising a positron emission tomography (PET) or single photon emission computed tomography (SPECT) image in an axial direction, wherein the sweeping operates on bodyline profiles derived from the first and second volumetric images and the method further comprises deriving the bodyline profiles as a boundary along a selected generally axially transverse direction of an imaged subject in the first and second volumetric images as a function of axial position; and
based on the sweeping, identifying an approximate relative positional offset between the first and second volumetric images;
wherein the method is performed by a digital data processing device.

19. The method as set forth in claim 18, further comprising:
performing an iterative image registration process using the approximate positional offset at least one of (i) as an initial condition and (ii) to define a constraint.

20. The method as set forth in claim 18, wherein the sweeping further comprises:
aligning the first and second volumetric images or bodyline profiles derived therefrom in at least one direction generally transverse to the axial direction.

21. The method as set forth in claim 18, wherein the method further comprises:
computing a similarity measure indicative of similarity of the bodyline profiles of the first and second volumetric images offset in the axial direction by the relative sweeping, the approximate relative positional offset being identified by optimizing the similarity measure as a function of the relative sweeping.

22. The method as set forth in claim 18, further comprising:
comparing the approximate relative positional offset between the first and second volumetric images with a threshold; and
detecting a misregistration between the first and second volumetric images based on the comparing.

23. The method as set forth in claim 18, wherein the subject includes a tumor or other malignancy undergoing radiation therapy, the method further comprising:
updating a radiation therapy plan to compensate for a positional change indicated by the approximate relative positional offset between the first and second volumetric images.

* * * * *